United States Patent [19]

Takemasa

[11] Patent Number: 5,062,985

[45] Date of Patent: Nov. 5, 1991

[54] REFRIGERANT COMPOSITION CONTAINING DICHLOROMONOFLUOROMETHANE

[75] Inventor: Kazuo Takemasa, Ota, Japan

[73] Assignee: Sanyo Electric Co., Ltd., Osaka, Japan

[21] Appl. No.: 538,617

[22] Filed: Jun. 15, 1990

[30] Foreign Application Priority Data

| Jun. 16, 1989 | [JP] | Japan | 1-155115 |
| Oct. 4, 1989 | [JP] | Japan | 1-259060 |
| Nov. 14, 1989 | [JP] | Japan | 1-295939 |
| Nov. 14, 1989 | [JP] | Japan | 1-295945 |

[51] Int. Cl.$^5$ .............................................. C09K 5/04
[52] U.S. Cl. ................................. 252/67; 62/114
[58] Field of Search ......................... 252/67; 62/114

[56] References Cited

U.S. PATENT DOCUMENTS

| 2,534,789 | 12/1950 | Miller et al. | 252/67 |
| 2,630,686 | 3/1953 | Reed et al. | 252/67 |
| 3,203,194 | 8/1965 | Fuderer | 252/67 |

FOREIGN PATENT DOCUMENTS

| 58-61173 | 4/1983 | Japan . |
| 60-166374 | 8/1985 | Japan . |
| 60-173082 | 9/1985 | Japan . |

*Primary Examiner*—Paul Lieberman
*Assistant Examiner*—Christine A. Skane
*Attorney, Agent, or Firm*—Armstrong, Nikaido, Marmelstein, Kubovcik & Murray

[57] ABSTRACT

The present invention provides a refrigerant composition including dichloromonofluoromethane and one or more fluoroalkyl compounds selected from trifluoromethane, pentafluoroethane, monochlorodifluoromethane, and 1-chloro-1,1-difluoroethane, this refrigerant composition having a considerably reduced depletion potential of ozone in the ozonosphere, achieving a satisfactory refrigerating temperature, and preventing seizing of the compressor of a refrigerating system.

7 Claims, 3 Drawing Sheets

`5,062,985`

REFRIGERANT COMPOSITION CONTAINING DICHLOROMONOFLUOROMETHANE

BACKGROUND OF THE INVENTION

1. Field of the Invention

The present invention relates to refrigerant compositions for use in refrigerating systems, and which have considerably reduced potential for ozone-depletion of the ozonosphere.

2. Description of the Prior Art

Conventionally, halogenated hydrocarbon refrigerants have been used as refrigerants for refrigerating systems. Among them, typically used are R-12 (dichlorodifluoromethane) and R-500 [an azeotropic mixture of R-12 and R-152a (1,1-difluoroethane)].

Under atmospheric pressure, the boiling points of R-12 and R-500 are $-29.65°$ C. and $-33.45°$ C., respectively, which are suitable for refrigerating systems. Further, even if their compressor inlet temperatures are comparatively high, their compressor outlet temperatures do not rise so high as to cause oil-sludge in the compressor. In addition, R-12 is highly compatible with an compressor oil, and hence plays a role of returning the entrained oil existing in a refrigerant circuit to the compressor.

However, the above refrigerants have high ozone-depletion potentials, and when released in the atmosphere and reached the ozonosphere, they destroy ozone of the ozonosphere. This destruction is caused by chlorine of refrigerant molecules.

To solve this problem, refrigerants excluding chlorine, for example, R-125 (pentafluoroethane, $CHF_2CF_3$), R-134a (1,1,1,2-tetrafluoroethane, $CH_2FCF_3$), and R-23 (trifluoromethane, $CF_3H$) are considered to be alternative refrigerants. Boiling points of R-125, R-134a and R-23 are $-48°$ C., $-26°$ C. and $-82.05°$ C., respectively under atmospheric pressure.

R-22 (monochlorodifluoromethane, $CClF_2H$) and R-142b (1-chloro-1,1-difluoroethane, $C_2ClF_2H_3$) contain chlorine molecules therein. However, they rarely destroy ozone of the ozonosphere because of their decomposition before reaching there with the help of hydrogen (H) contained therein. Boiling points of R-22 and R-142b are $-40.75°$ C. and $-9.8°$ C., respectively under atmospheric pressure.

U.S. Pat. No. 4,810,403, for example, discloses some blends of the above refrigerants not adversely affecting the ozonosphere, each of which is a combination of two or more of the above refrigerants.

However, such blends of the refrigerants as disclosed in the above U.S. Pat. have the following disadvantages. The blends of R-125, R-134a, or R-23 are extremely poor in compatibility with compressor oils used in a refrigerating cycle because the compatibility with the oils depends mainly upon chlorine (Cl) of the refrigerants. As well, the blends of R-22 or R-142b, although they contain chlorine, do not exhibit satisfactory compatibility with naphthene or paraffin oils.

Where a refrigerant has poor compatibility with a compressor oil, separation into two phases (oil and refrigerant) occurs in an evaporator so that the oil scarcely returns to the compressor, with the result that bearing portions of the compressor may seize. In addition, the oil becomes liable to adhere to the piping of the refrigerating circuit, resulting in blockage of the refrigerating circuit.

The lower the boiling point of a blended refrigerant, the more conspicuous becomes this tendency. Especially, a serious problem exists in application of the blended refrigerants to a refrigerating system requiring a refrigerating temperature of lower than $-20°$ C., for example, $-40°$ C. or $-80°$ C.

Japanese Published Unexamined Patent Application Hei 1-141982 discloses a blended composition of R-134a and dichloromonofluoromethane (R-21) and teaches its application to refrigerating systems. However, where such a composition is used as a refrigerant, a refrigerating temperature of $-40°$ C. or $-80°$ C. cannot be attained.

Where R-22 is singly used as a refrigerant, a compressor inlet temperature thereof is required to be considerably lowered so as to repress rise of a compressor outlet temperature thereof. However, blending R-142b with R-22 makes it possible to lower the outlet temperature because the outlet temperature of R-142b does not rise so high even if its inlet temperature is comparatively high.

Further, blending R-142b with R-22 forms a nonflammable composition despite the flammability of R-142b thereby improving in safety. FIG. 4 shows flammability relative to mixing ratios of R-142b, R-22, and air, wherein the hatched area is a flammable area while the other area being an nonflammable area. It can be understood from this figure that mixing more than 10 wt % of R-22 can avoid the flammable area of R-142b.

When an ambient temperature is low, for example, less than $0°$ C. in winter, in case that refrigerant leakage from the refrigerant circuit occurs, and R-22 having a lower boiling point precedently evaporates and dissipates. Therefore, R-142b remains solely or dissolved in the compressor oil. If the refrigerant temperature subsequently is raised due to rise of the ambient temperature, bringing a torch for repairing close to the refrigerant, or the like, only the flammable R-142b flows out, resulting in an eventual explosion thereof.

The present invention aims to overcome the various problems ascribed to the prior art as described above.

SUMMARY OF THE INVENTION

Accordingly, the present invention provides a refrigerant composition comprising dichloromonofluoromethane (R-21) and at least one fluoroalkyl compound selected from the group consisting of trifluoromethane (R-23), pentafluoroethane (R-125), monochlorodifluoromethane (R-22), and 1-chloro-1,1-difluoroethane (R-142b).

This invention is accomplished on the basis of a discovery wherein blending dichloromonofluoromethane (R-21) with the fluoroalkyl compounds selected from the above compound group can yield refrigerant compositions with significantly reduced ozone-depletion potentials of the ozonosphere, capable of realizing very low refrigerating temperatures such as $-40°$ C. or $-80°$ C., and highly compatible with compressor oils.

DETAILED DESCRIPTION OF THE PREFERRED EMBODIMENTS

Refrigerant compositions according to the invention are classified into Embodiments 1 and 2. Embodiment 1 consists of blends of dichloromonofluoromethane (R-21) with trifluoromethane (R-23) and/or pentafluoroethane (R-125) which are fluoroalkyl compounds with no chlorine in their molecules. Embodiment 2 consists of blends of dichloromonofluoromethane (R-21) with monochlorodifluoromethane (R-22) and/or 1-chloro-1,1-difluoroethane (R-142b) which are fluoroalkyl compounds containing chlorine and hydrogen in their molecules.

In the above Embodiment 1, R-21 content in the compositions is suitably 0.1–50 wt %. Especially in the composition blended R-21 with R-23, R-21 content is preferably 30–50 wt %, most preferably 35–45 wt %.

In the above R-21 content range of 30–50 wt %, the refrigerant compositions which are highly compatible with oils and capable of realizing refrigerating temperatures of −80° C. or below can be prepared.

In the above Embodiment 2, R-21 content is suitably 0.1–50 wt % which is identical to that in Embodiment 1. However, from the point of view of lowering compressor outlet temperatures of the refrigerants so as to prevent the compressor from seizing as completely as possible, contents of R-21, R-22, and R-142b in the refrigerant compositions are preferably 2–12 wt %, 50–93 wt %, and 5–48 wt %, respectively. In the above preferable contents, the refrigerant compositions which are highly compatible with oils and capable of realizing refrigerating temperatures of −40° C. or below can be prepared. Besides, their compressor outlet temperatures are less than 160° C. Contents of R-21, R-22, and R-142b are more preferably 3–7 wt %, 67–74 wt %, and 23–28 wt %, respectively.

R-21 in the refrigerant compositions of the invention contains chlorine (Cl), which however coexists with hydrogen (H). Therefore, R-21 is decomposed before reaching the ozonosphere whereby its ozone depletion potential can considerably reduced. Further, R-21 is very compatible with compressor oils of the refrigerating cycle so that blending it with low compatible refrigerants such as R-125, R-23, R-22, and R-142b causes the oils entrained in the refrigerant circuit to be dissolved in R21 for returning the oils to the compressor. Still further, since the boiling point of R-21 is +8.95° C. under the atmospheric pressure, it evaporates in the compressor to cool the compressor.

Figure 3:
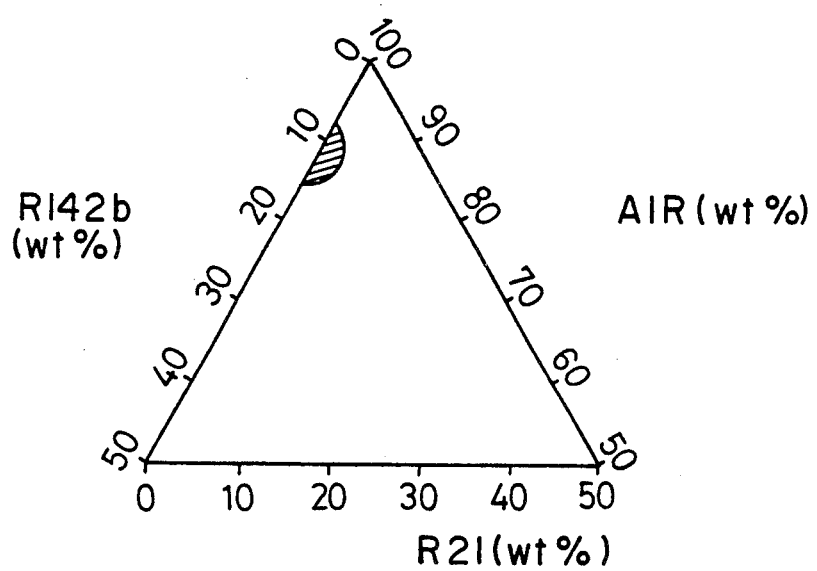
FIG. 3 is a view showing a nonflammable area of R-142b in a mixture of R-142b, R-21, and air.
Figure 4:
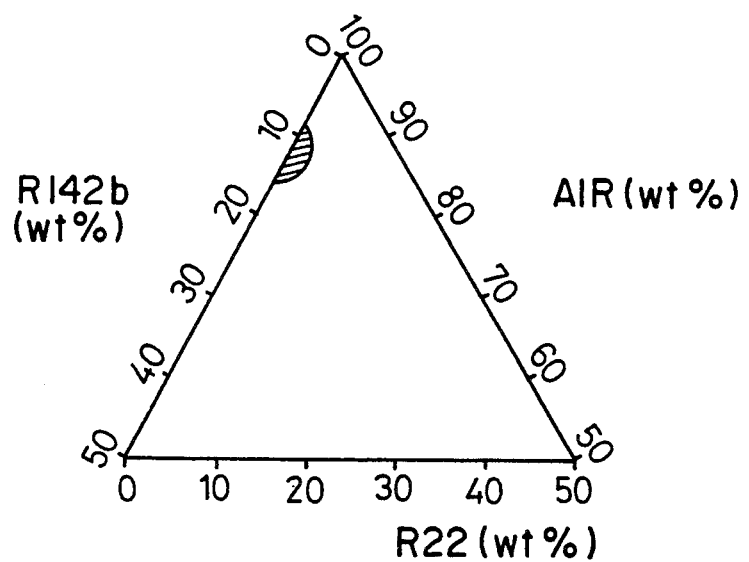
FIG. 4 is a view showing a nonflammable area of R-142b in a mixture of R-142b, R-22, and air.

In addition, blending R-21 with R-142b makes it possible to form a nonflammable area of R-142b (non-hatched area) as shown In FIG. 3, which is the same function as R-22. Therefore, even after the dissipation of R-22 caused by leakage of the refrigerant as described above, R-21 remains together with R-142b in the refrigerant circuit so that the remaining refrigerant composition is kept nonflammable, whereby an explosion thereof can be prevented.

This explosion-proof effect becomes more effective as the weight ratio of R-21 to R-142b grows larger. However, since the boiling point of R-21 is relatively high, too much weight ratio of R-21 degrades the refrigerating capability so that required refrigerating temperatures cannot be obtained. According to our experiments, blending 5–20 wt % of R-21 relative to R-142b could make explosion-proof refrigerants without degrading the refrigerating capabilities thereof.

As a result of further intensive research, the inventor has discovered the most effective proportion of the contents, i.e., 70 wt % of R-22, 25 wt % of R-142b, and 5 % of R-21. The refrigerant of this proportion is the most safe and can realize the required temperature (at least −40° C.) for a refrigerator.

Incidentally, R-134a is compatible with alkylbenzoic oils within an appropriate range, therefore, it effects the oil-returning function as similarly as R-21 does. Besides according to the experiments, the boiling point of R-134a contained in the refrigerant composition was −30° C. or less in the case that the refrigerant contents were 70 wt % of R-22, 25 wt % of R-142b, and 5 % of R-134a.

EXAMPLE

Figure 1:
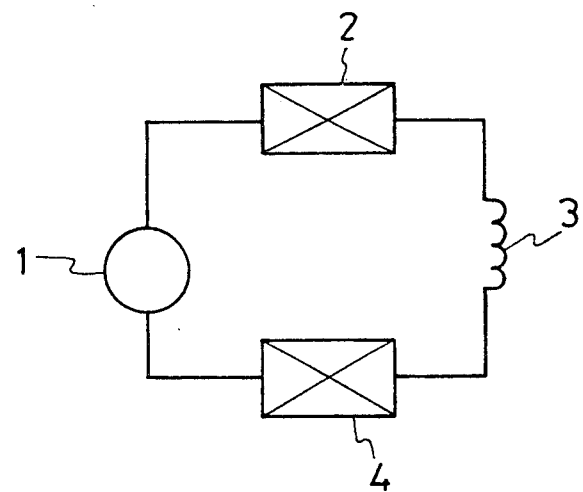
FIGS. 1 and 2 are each an explanatory view of a refrigerant circuit used in an example of the invention.

Hereinafter, examples of the invention will be explained in conjunction with drawings. FIG. 1 shows a refrigerant circuit of a common refrigerating cycle. A compressor 1 driven by a motor, a condenser 2, a capillary tube 3, and an evaporator 4 are sequentially connected. The compressor 1 is adapted to use naphthene, alkylbenzene, or paraffin oils as hydraulic oils. In this example, used is an alkylbenzene oil (CF-32; IDEMITSU KOSAN CO., LTD.). This refrigerating circuit is charged with a blended refrigerant of 90 % of R-125 and 10 wt % of R-21. Another possible blended refrigerant to be charged in the circuit is a blend of 60 wt % of R-23 and 40 wt % of R-21.

Now, to be explained is an operation of the refrigerating circuit shown in FIG. 1. The refrigerant composition of a high temperature and high pressure flowed out of the compressor 1 in a gaseous form flows into the condenser 2 to dissipate its heat and to be liquefied. The refrigerant composition is then reduced its pressure at the capillary tube 3 and flows into the evaporator 4 where it evaporates so that refrigeration can be performed, followed by returning to the compressor 1. However, as the boiling point of R-21 is relatively high as described above, it returns to the compressor 1 in a liquid form with the compressor oil dissolved thereinto, and evaporates at last in the compressor 1 thereby cooling it. As a result, the oil existing in the refrigerant circuit can return to the compressor 1, and at the same time the compressor outlet temperature of the refrigerant can be lowered.

The refrigerant may be selected depending on a type of the refrigerating system because the refrigerating temperature to be realized at the evaporator 4 depends on a refrigerant to be used. For example, the above blended refrigerant of R-125 and R-21 is suitable for a refrigerator of domestic use requiring refrigerating temperatures of approximately −20° to −40° C., and the blended refrigerant of R-23 and R-21 is suitable for a refrigerator of very low temperatures requiring refrigerating temperatures of approximately −80° C.

In this case, as the boiling point of R-21 is relatively high, too large mixing ratio of R-21 hinders realization of the required refrigerating temperatures at the evaporator 4; in contrast, too small mixing ratio thereof degrades the oil-returning function. From the above view point, the mixing ratio of R-21 should be selected from the range of 0.1–50 wt %. Especially in the combination of R-21 and R-125, the content of R-21 is suitably 5–15 wt %, preferably 7–12 wt %. In the combination of R-21 and R-23, the content of R-21 is suitably 30-50 wt %, preferably 35-45 wt %.

Other refrigerant compositions applicable to the refrigerant circuit shown in FIG. 1 are a combination of R-22 and R-21, and that of R-142b and R-21. In these combinations, the content of R-21 is suitably 5-25 wt %, preferably 10-15 %. In the combination of R-21 and R-142b, although R-142b is flammable, mixing R-21 thereto enables to maintain the blend within a nonflammable area. FIG. 3 shows such a nonflammable area.

Figure 2:
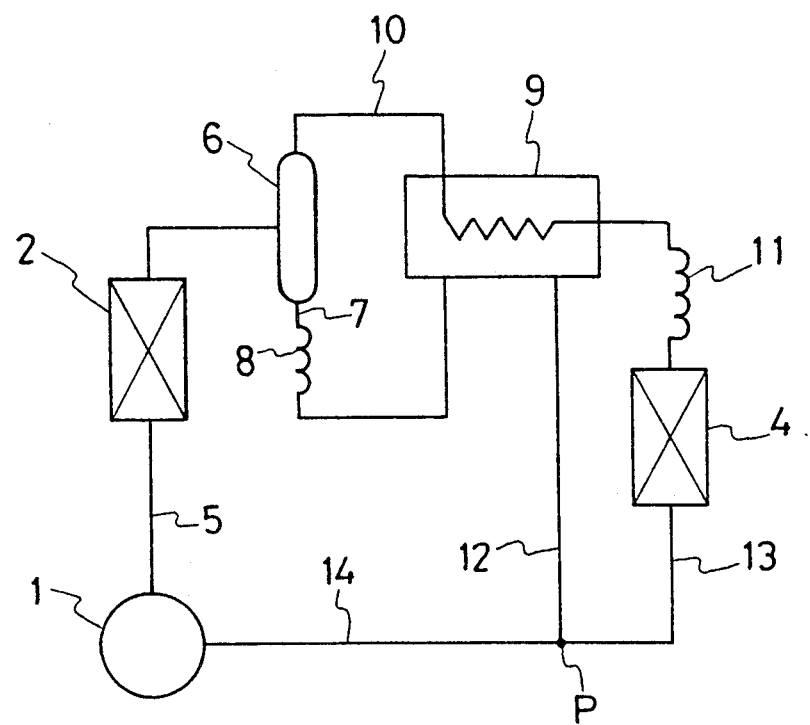

Here, described is another example of the invention in which a refrigerant composition of a combination of R-22, R-142b, and R-21 is used in a refrigerant circuit shown in FIG. 2. This refrigerant circuit is a refrigerating cycle for the blended refrigerant of R-22, R-142b, and R-21. In FIG. 2, the same reference numerals as in FIG. 1 designate the same parts. An outlet piping 5 of a compressor 1 connects to a condenser 2 which links to a gas-liquid separator 6. A liquid conducting piping 7 extending from the gas-liquid separator 6 connects to a capillary tube 8 which links to an intermediate heat exchanger 9. On the other hand, a gas conducting piping 10 extending from the gas-liquid separator 6 passes through the intermediate heat exchanger 9 and connects to a capillary tube 11 which links to an evaporator 4. A piping 12 extending from the intermediate heat exchanger 9 and a piping 13 extending from the evaporator 4 joins together at a junction P and connect to an inlet piping 14 of the compressor 1.

The refrigerant circuit in FIG. 2 is charged with a non-azeotropic mixture of R-22, R-142b, and R-21. Description of an operation of the circuit follows. A high temperature and high pressure gas of the above blended refrigerant discharged from the compressor 1 flows into the condenser 2 to dissipate its heat, whereby most part of R-142b and R-21 is liquefied and flows into the gas-liquid separator 6. The liquid of R-142b and R-21, and R-22 still in a gaseous form are separated there, the former is conducted to the liquid conducting piping 7 while the latter being conducted to the gas conducting piping 10. R-142b and R-21 passing through the liquid conducting piping 7 flow into the capillary tube 8 in which their pressure is reduced, and then flow into the intermediate heat exchanger 9 in which R-142b evaporates. On the other hand, R-22 passing through the gas conducting piping 10 is cooled and condensed when passing through the intermediate heat exchanger 9 by R-142 which evaporates there. R-22 is then reduced in its pressure in the capillary tube 11 and flows into the evaporator 4 where it evaporates for refrigerating. R-142b and R-21 flowing out of the intermediate heat exchanger 9 and R-22 flowing out of the evaporator 4 pass through the pipings 12 and 13 respectively, join together at the junction P to form again the mixture of R-22, R-142b, and R-21, and return to the compressor 1.

The compressor oil which is entrained in the refrigerant circuit, is dissolved in R-21 and returned to the compressor. R-21 having been returned to the compressor 1 evaporates there so that the compressor 1 is cooled. Therefore, an compressor outlet temperature of the refrigerant can be further lowered.

When contents of the refrigerant used in the refrigerant circuit is to be decided, it should be considered that too much R-21 renders R-142 more non-explosive and more safe, however, the refrigerating capability at the evaporator 4 degrades so that the refrigerant cannot be used for a refrigerator. Further to be considered are compatibility of the refrigerant with compressor oils and an compressor outlet temperature of the refrigerant. In view of the above considerations, it is preferable to mix 2-12 wt % of R-21, 50-93 wt % of R-22, and 5-48 wt % of R-142b. For example, the refrigerant having 57 wt % of R-22, 38 wt % of R-142b, and 5 wt % of R-21 has attained a refrigerating temperature of −40° C. and exhibited a high explosion-proof characteristic. Further, the refrigerant having 70 wt % of R-22, 25 wt % of R-142b, and 5 % of R-21 has been able to attain a lower refrigerating temperature than above.

Since the refrigerating temperature of −40° C. can be obtained, this refrigerant composition can be advantageously used in various refrigerating systems for either industrial or domestic use.

Figure 5:
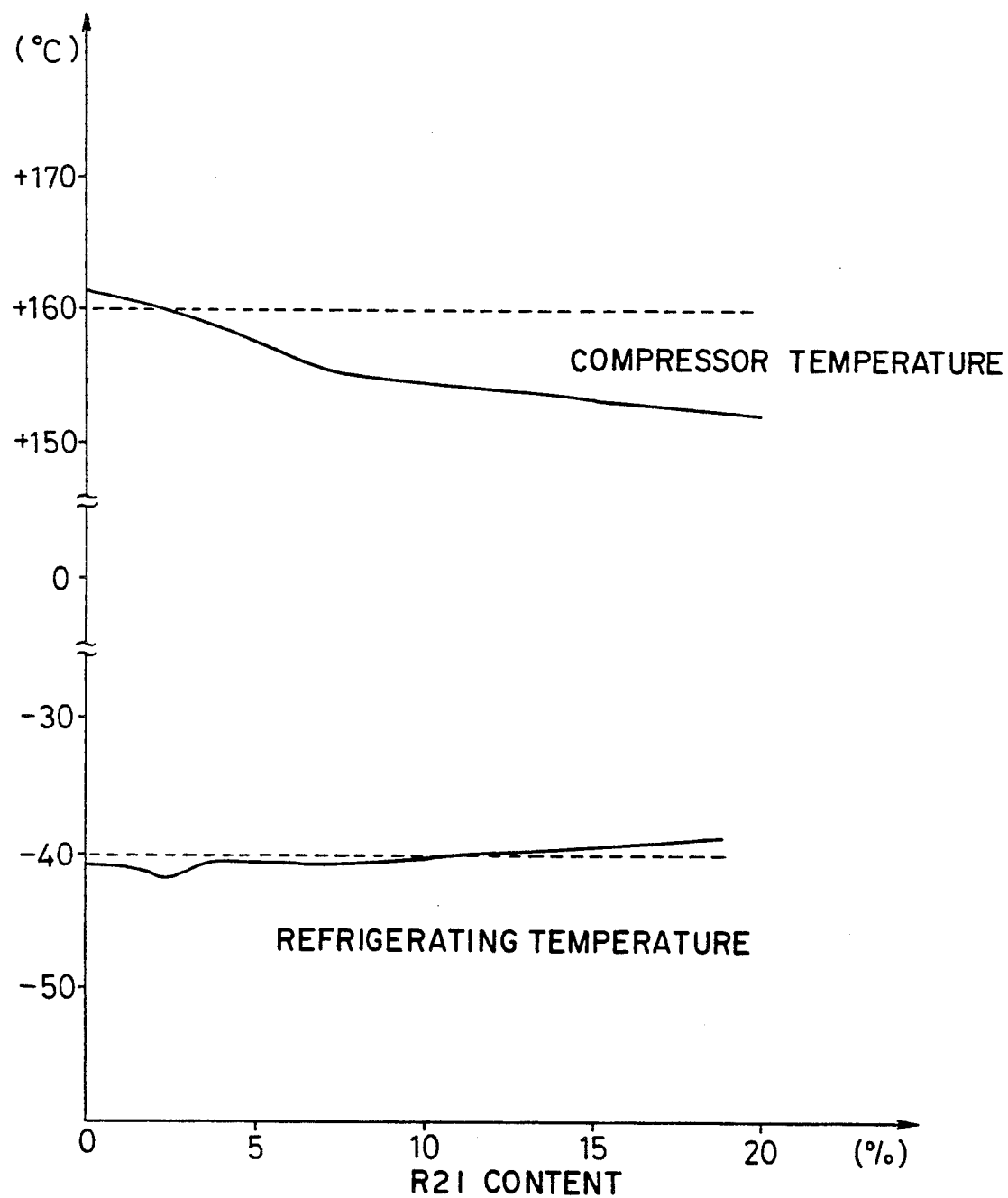
FIG. 5 is a graph showing a relationship among component ratio of R-21 in a blended refrigerant of R-22, R-142b, and R-21, an compressor temperature, and a refrigerating temperature.

For better understanding, FIG. 5 shows variations of a compressor temperature and a refrigerating temperature at the evaporator with respect to the refrigerant composition whose content ratios are varied, however, a ratio of R-22 to R-142b is constant (74:26).

According to the present invention, refrigerant compositions having considerably reduced depletion potentials of ozone in the ozonosphere can be obtained. Further, dichloromonofluoromethane (R-21) of the refrigerant compositions is compatible with compressor oils so that the oil entrained in the refrigerant circuit can be returned to the compressor thereby preventing seizing of the compressor. Furthermore, R-21 of the refrigerant compositions functions to cool the compressor thereby aiding in preventing oil-sludge.

Further according to the invention, in the case that refrigerant compositions are prepared by blending 1-chloro-1,1-difluoroethane (R-142b), R-21 of the refrigerant compositions can maintain the compositions within a nonflammable area, so that eventual explosion of 1-chloro-1,1-difluoroethane can be prevented even if leakage of the refrigerant from the refrigerant circuit may occurs.

Still further according to the invention, by determining the ratio of R-21 to R-142b within the range of 5-20 wt %, degradation of the refrigerating capability caused by blending R-21 having a high boiling point can be prevented thereby assuring the refrigerating capability and explosion-proof characteristic of the refrigerant compositions.

It should be noticed that a non-azeotropic refrigerant composition of R-22, R-142b, and R-134a is also applicable to the refrigerant circuit shown in FIG. 2. R-134a of this refrigerant composition circulates in the refrigerant circuit as described above with respect to R-21. In this case, the compressor oil is dissolved in R-134a and returned to the compressor 1. However, since R-134a is not compatible with naphthenic oils, it is required to use alkylbenzoic oils as the compressor oil. Further, since the amount of R-134a which can be dissolved even in an alkylbenzoic oil is limited, the content of R-134a should be determined within the limited soluble range.

According to the experiments, it was found that a suitable mixing ratio of R-134a to the total weight of the refrigerant composition was 5 %. Accordingly, the mixing ratios of the refrigerant composition was determined as 70 wt % of R-22, 25 wt % of R-142b, and 5 % of R-134a. According to the experiments using the refrigerant composition of the above contents, a refrigerating temperature of −30° C. was attained at the evaporator 4 under the atmospheric temperature, and at the same time R-134a was dissolved in the compressor oil thereby enjoying a satisfactory oil-returning effect.

What is claimed is:

1. A refrigerant composition consisting essentially of from 50 to 0.1 wt % of dichloromonofluoromethane and respectively from 50 to 99.9 wt % of at least one fluoroalkyl compound selected from the group consisting of trifluoromethane, pentafluoroethane, monochlorodifluoromethane and 1-chloro-1,1-difluoroethane.

2. The refrigerant composition as set forth in claim 1, which comprises dichloromonofluoromethane and a fluoroalkyl compound selected from the group consisting of trifluoromethane, pentafluoroethane and mixtures thereof.

3. The refrigerant composition as set forth in claim 1, which comprises dichloromonofluoromethane and a fluoroalkyl compound selected from the group consisting of monochlorodifluoromethane, 1-chloro-1,1-difluoroethane and mixtures thereof.

4. The refrigerant composition as set forth in claim 1, which is prepared so that a refrigerating temperature thereof at an evaporator can be −20° C. and below.

5. The refrigerant composition as set forth in claim 1, which is prepared so that a refrigerating temperature thereof at an evaporator can be −40° C. and below.

6. The refrigerant composition as set forth in claim 1, which contains 30–50 wt % of dichloromonofluoromethane.

7. The refrigerant composition as set forth in claim 3, which comprises 2–12 wt % of dichloromonofluoromethane, 50–93 wt % of chlorodifluoromethane and 5–48 wt % of 1-chloro-1,1-difluoroethane.

* * * * *